(12) United States Patent
Haffner et al.

(10) Patent No.: US 6,863,768 B2
(45) Date of Patent: Mar. 8, 2005

(54) WATER RESISTANT EDGE OF LAMINATE FLOORING

(75) Inventors: Curt Richard Haffner, Temple, TX (US); Jerry Lee Malina, Temple, TX (US); Thomas J. Nelson, Belton, TX (US)

(73) Assignee: Premark RWP Holdings Inc., Wilmington, DE (US)

( * ) Notice: Subject to any disclaimer, the term of this patent is extended or adjusted under 35 U.S.C. 154(b) by 0 days.

(21) Appl. No.: 10/278,915

(22) Filed: Oct. 24, 2002

(65) Prior Publication Data

US 2003/0046895 A1 Mar. 13, 2003

Related U.S. Application Data

(60) Division of application No. 09/715,079, filed on Nov. 20, 2000, now abandoned, which is a continuation-in-part of application No. 09/436,317, filed on Nov. 8, 1999, now Pat. No. 6,460,306.

(51) Int. Cl.⁷ .......................... B29C 65/00; E04F 15/00

(52) U.S. Cl. ................ 156/304.1; 156/304.3; 156/304.5; 156/257; 156/266; 52/578

(58) Field of Search ............... 156/304.1, 304.5, 156/304.3, 257, 258, 266, 268; 52/578

(56) References Cited

U.S. PATENT DOCUMENTS

| | | | |
|---|---|---|---|
| 753,791 A | | 3/1904 | Fulghum |
| 1,859,667 A | | 5/1932 | Gruner |
| 3,823,525 A | * | 7/1974 | Bruun .................. 52/309.2 |
| 4,104,840 A | | 8/1978 | Heintz et al. ........... 52/309.9 |
| 5,022,208 A | * | 6/1991 | Ehrat et al. ............ 52/586.2 |

(List continued on next page.)

FOREIGN PATENT DOCUMENTS

| | | |
|---|---|---|
| BE | 557844 | 6/1957 |
| BE | 765.817 | 4/1971 |
| CA | 1 169 106 | 6/1984 |
| DE | 2238660 | 2/1974 |
| DE | 35 44 845 | 6/1987 |
| DE | 42 15 273 | 11/1993 |
| DE | 42 42 530 | 6/1994 |
| DE | 299 11 462 | 12/1999 |
| EP | 1 024 234 A2 | 2/2000 |
| EP | 843 763 | 4/2000 |
| EP | 1 026 341 | 9/2000 |
| FR | 2.224.353 | 10/1974 |
| JP | 54-13624 | 6/1977 |
| JP | 55-42768 | 9/1978 |
| JP | 5-94447 | 5/1992 |
| JP | 7-91027 | 9/1993 |
| JP | 8-302957 | 4/1995 |
| JP | 7-300979 | 11/1995 |
| JP | 2001-49838 | 8/1999 |

(List continued on next page.)

Primary Examiner—Blaine Copenheaver
Assistant Examiner—Justin Fischer
(74) Attorney, Agent, or Firm—Welsh & Flaxman LLC

(57) ABSTRACT

A method for forming the edge profile of a decorative laminate panel, wherein the decorative laminate panel includes a decorative surfacing layer, a backing layer and a substrate positioned between the decorative surfacing layer and the backing layer. The method is achieved by creating a recess defined by the decorative surfacing layer and the backing layer, forming an edge member shaped and dimensioned for placement within the recess, the edge member including an interlocking profile, and positioning the edge member within the recess with the interlocking profile exposed for selective attachment to adjacent laminate panels. The invention further relates to a laminate panel manufactured by the method described above. In addition, the invention relates to a connecting system for coupling adjacent panels. The connecting system employs a track locking strip in securely coupling the panels in accordance with the present invention.

15 Claims, 6 Drawing Sheets

U.S. PATENT DOCUMENTS

| | | | | |
|---|---|---|---|---|
| 5,295,341 A | * | 3/1994 | Kajiwara | 52/586.2 |
| 5,348,778 A | * | 9/1994 | Knipp et al. | 428/35.8 |
| 5,502,939 A | | 4/1996 | Zadok et al. | 52/309.9 |
| 5,797,237 A | | 8/1998 | Finkell, Jr. | 52/589.1 |
| 5,860,267 A | | 1/1999 | Pervan | 52/748.1 |
| D406,360 S | | 3/1999 | Finkell, Jr. | D52/138 |
| 6,209,278 B1 | | 4/2001 | Tychsen | 52/592.4 |
| 6,247,285 B1 | | 6/2001 | Moebus | 52/589.1 |
| 6,324,803 B1 | | 12/2001 | Pervan | 52/403.1 |
| 6,324,809 B1 | | 12/2001 | Nelson | 52/592.2 |
| 6,332,733 B1 | | 12/2001 | Hamberger et al. | 403/329 |
| 6,345,481 B1 | | 2/2002 | Nelson | 52/592.2 |
| 6,397,547 B1 | * | 6/2002 | Martensson | 52/582.1 |
| 6,418,683 B1 | | 7/2002 | Martensson et al. | 52/282.1 |
| 6,421,970 B1 | | 7/2002 | Martensson et al. | 52/282.1 |
| 6,446,405 B1 | | 9/2002 | Pervan | 52/403.1 |
| 6,465,046 B1 | | 10/2002 | Hansson et al. | 427/256 |
| 2001/0024707 A1 | | 9/2001 | Andersson et al. | 428/60 |
| 2001/0029720 A1 | | 10/2001 | Pervan | 52/745.19 |
| 2001/0034991 A1 | | 11/2001 | Martensson et al. | 52/578 |
| 2002/0007608 A1 | | 1/2002 | Pervan | 52/578 |
| 2002/0007609 A1 | | 1/2002 | Pervan | 52/590.2 |
| 2002/0014047 A1 | | 2/2002 | Thiers | 52/313 |
| 2002/0046528 A1 | | 4/2002 | Pervan et al. | 52/588.1 |
| 2002/0056245 A1 | | 5/2002 | Thiers | 52/589.1 |
| 2002/0057942 A1 | | 5/2002 | Hamberger et al. | 403/329 |
| 2002/0100242 A1 | | 8/2002 | Olofsson | 52/588.1 |
| 2002/0112433 A1 | | 8/2002 | Pervan | 52/592.1 |
| 2002/0127051 A1 | | 9/2002 | Olofsson et al. | 403/268 |

FOREIGN PATENT DOCUMENTS

| | | |
|---|---|---|
| TW | 319284 | 11/1987 |
| WO | WO 98/58142 | 12/1998 |
| WO | WO 99/66151 | 12/1999 |
| WO | WO 01/66876 | 9/2001 |

* cited by examiner

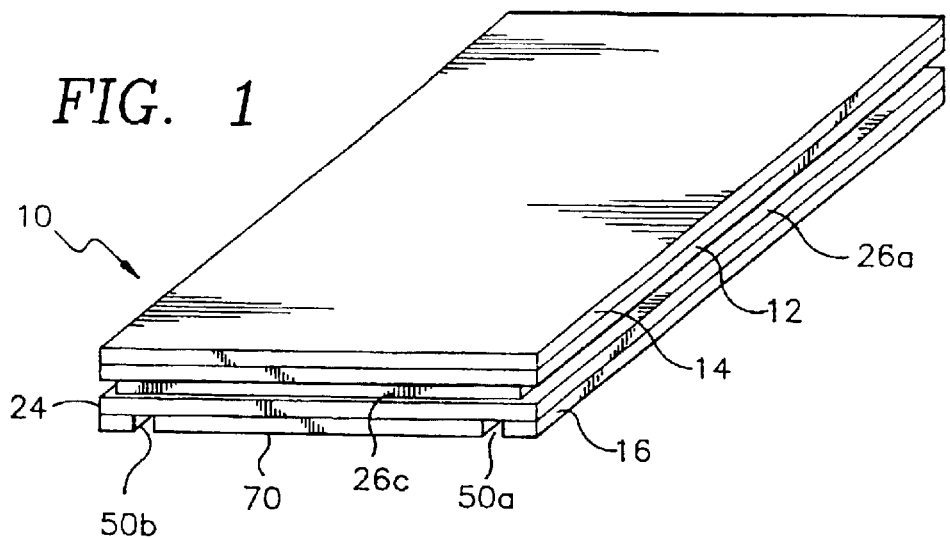
FIG. 1
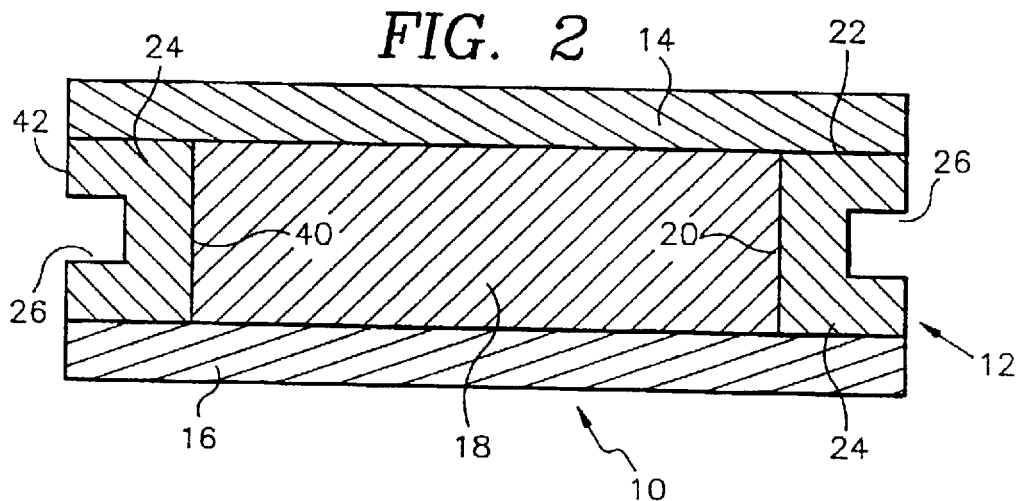
FIG. 2
FIG. 3
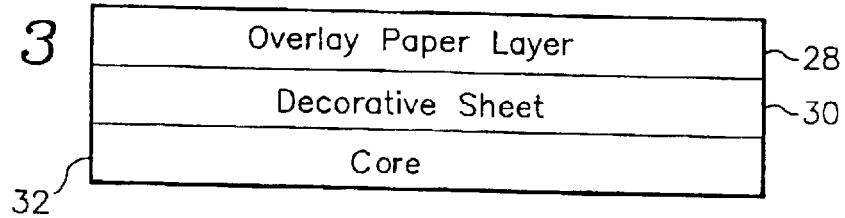
FIG. 4
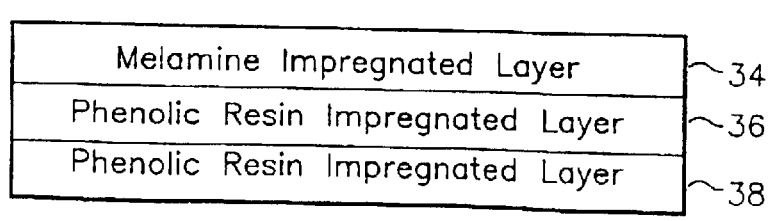

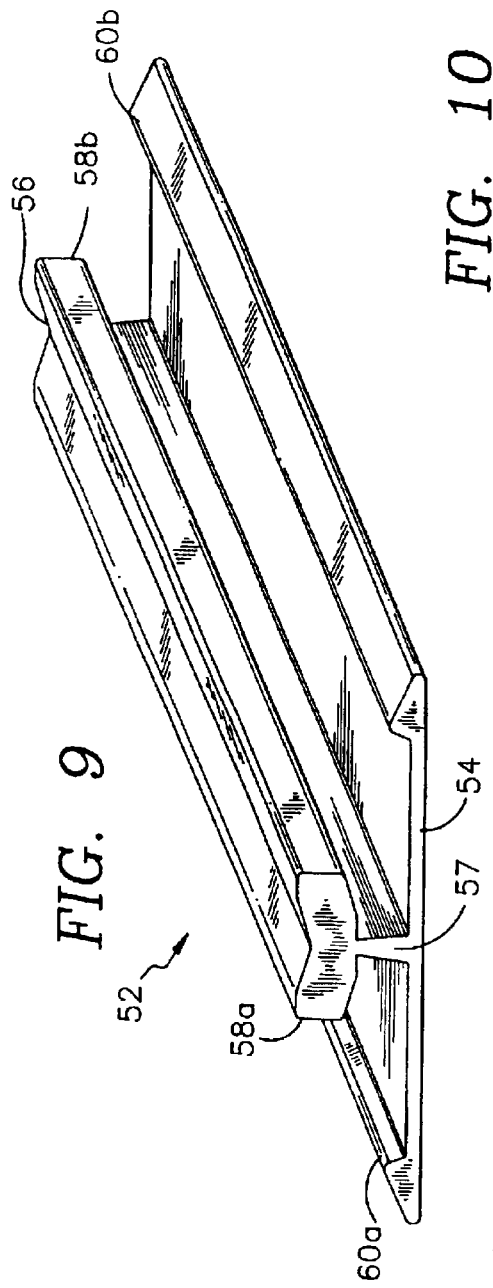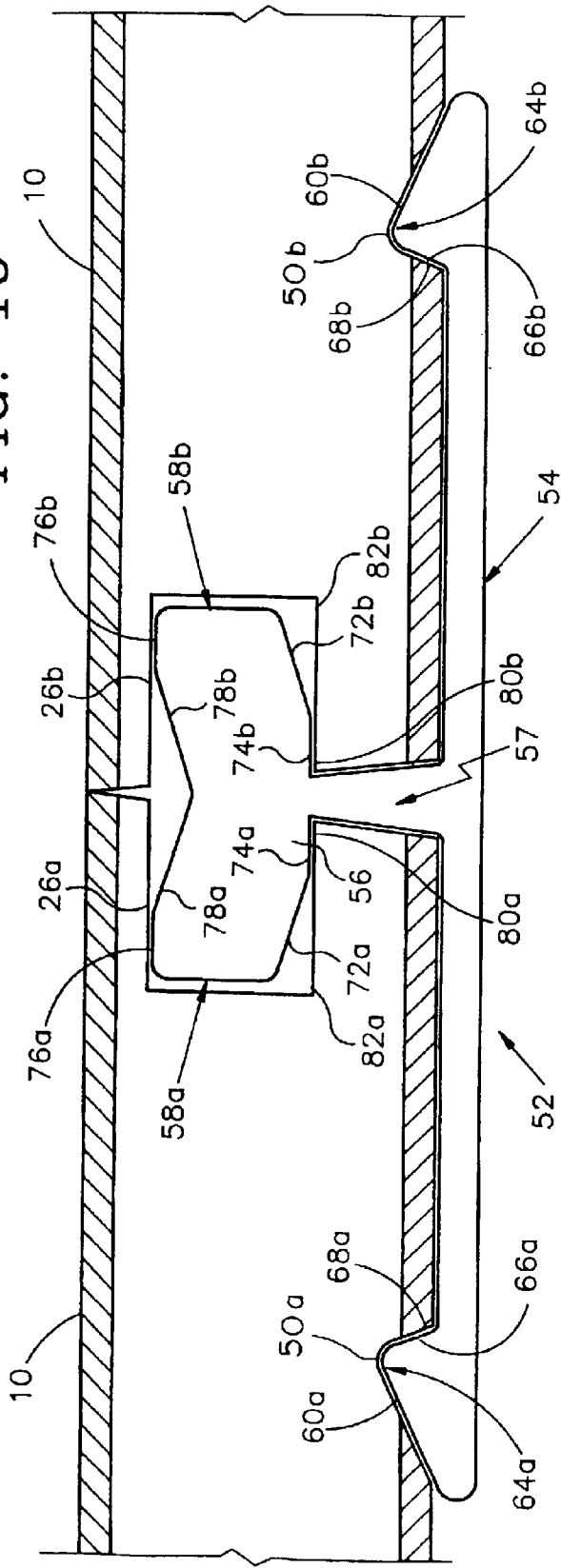

WATER RESISTANT EDGE OF LAMINATE FLOORING

RELATED APPLICATIONS

The present application is a divisional of U.S. patent application Ser. No. 09/715,079, filed Nov. 20, 2000 now abandoned, and entitled "Water Resistant Edge of Laminate Flooring", and which is a continuation-in-part of U.S. patent application Ser. No. 09/436,317, filed Nov. 8, 1999, and entitled "Interconnecting Disengageable Flooring System", which is currently U.S. Pat. No. 6,460,306.

BACKGROUND OF THE INVENTION

1. Field of the Invention

The invention relates to decorative laminate panels. More particularly, the invention relates to decorative laminate panels including a water resistant edge.

2. Description of the Prior Art

Decorative laminates have found widespread use as their ability to replicate natural materials has improved over the years. For example, decorative laminates are commonly used as replacement materials for natural materials in the construction of flooring, furniture, cabinets, and countertops. In each of these applications, a decorative surfacing layer is bonded to a substrate, namely, plywood, particleboard, chipboard, medium density fiberboard, etc., for added structural stability. The term "corestock" is used throughout the body of the present application to generally describe the various wood-based substrates used in the fabrication of decorative laminate panels.

In addition to other problems confronted in the fabrication of decorative laminate products, the penetration of moisture into the substrate is of the utmost concern. Moisture renders wood-based substrates highly susceptible to warping, shrinkage, and separation between the decorative surfacing layer and the substrate.

Cabinets and countertops, as well as other applications in which decorative laminates are employed, permit the substrate to be fully encased within decorative laminates, or other resin impregnated laminate sheets. Since these resin impregnated laminate sheets substantially prevent the passage of moisture to the underlying substrate, manufacturers of these decorative laminate products need not worry that the wood-based substrate will be exposed to undesirable moisture.

However, decorative laminate flooring systems, as well as hardwood flooring systems, generally require that adjacent panels be linked along their edges to provide ideal installation with no open seams. Where laminate flooring systems are installed, the tops and bottoms of the individual panels are covered with resin impregnated laminates. The substrates of these panels are thereby protected from the direct penetration of moisture through either the top or bottom surfaces. However, and due to the requirement that the edges of the flooring panels be milled to provide a desired interlocking profile, it is difficult to seal the edges of the panels against the penetration of moisture. Various sealing techniques have been attempted. However, these attempts have been of only limited success.

The edges of a flooring panel are, therefore, exposed to moisture found above and below the installed panel. For example, when an individual spills a drink the decorative surfacing layer protects the top surface of the substrate from the spilled drink. However, a portion of the liquid will invariably make its way between the adjacent panels and into direct contact with the exposed edge of the substrate. Similarly, where flood conditions force water under the flooring system, the backing layer protects the substrate from directly contacting the bottom surface of the substrate. However, the water will once again make its way between the adjacent panels and into direct contact with the exposed edge of the substrate.

The edge profiles used in the manufacture of laminate flooring panels require the use of extensive and expensive cutting tools in converting a large panel into multiple panels, as well as in cutting the required edge detail in the flooring panels. The extensive use of cutting tools adds substantial time and expense to the fabrication process. For example, the positioning and wear status of the cutting tools must be continuously monitored to ensure the manufacture of consistent high quality flooring panels. The cutting tools are also preferably diamond tipped and maintenance of these diamond tipped cutting tools adds substantial expense to the fabrication process.

In addition to the cost and maintenance problems associated with the use of conventional cutting tools in the manufacture of flooring panels, the use of cutting tools limits the possible edge profiles which may be applied in the manufacture of flooring panels. These limitations in turn restrict the possible designs that might be used to improve the functionality and maintenance of flooring panels.

As such, a need exists for a decorative laminate panel offering a water resistant edge. A need further exists for an improved method for manufacturing the edge profile of a decorative laminate panel. The present invention provides a method and panel overcoming the shortcomings of the prior art.

SUMMARY OF THE INVENTION

It is, therefore, an object of the present invention to provide a method for forming the edge profile of a decorative laminate panel, wherein the decorative laminate panel includes a decorative surfacing layer, a backing layer and a substrate positioned between the decorative surfacing layer and the backing layer. The method is achieved by creating a recess defined by the decorative surfacing layer and the backing layer, forming an edge member shaped and dimensioned for placement within the recess, the edge member including an interlocking profile, and positioning the edge member within the recess with the interlocking profile exposed for selective attachment to adjacent laminate panels.

It is also an object of the present invention to provide a decorative laminate panel. The panel includes a decorative surfacing layer, a backing layer and a substrate positioned between the decorative surfacing layer and the backing layer. The substrate includes an edge wherein the decorative surfacing layer, the edge of the substrate and the backing layer define a recess. The panel further includes an edge member positioned within the recess. The edge member includes an outwardly facing interlocking profile shaped and dimensioned for selective attachment to adjacent laminate panels.

It is a further object of the present invention to provide a method for forming a decorative laminate panel. The method is achieved by first bonding a decorative surfacing layer to a first side of a substrate and bonding a backing layer to a second side of a substrate, wherein the decorative surfacing layer and the backing layer define a recess along the edge of the panel. An edge member is then formed. The edge member is shaped and dimensioned for placement within the recess, and includes an interlocking profile. Finally, the edge member is positioned within the recess with the interlocking profile exposed for selective attachment to adjacent laminate panels.

It is another object of the present invention to provide a disengageable interconnecting system for use in forming a surface composed of individual panels on a support structure. The system includes at least two panels and at least one connector. Each of the panels has at least one outer edge with a recess formed therein. Each panel further includes a groove formed in a bottom surface of the panel adjacent the recess formed along the outer edge, the groove being shaped and dimensioned for receipt of the connector. The connector includes a base having a projection extending therefrom. The projection is shaped and dimensioned for receipt within the recess in the outer edge of each panel in a manner preventing movement in a direction perpendicular to a plane in which the panel lies. The base of the connector further includes two protrusions extending from opposite sides of the base and spaced from the projection. The protrusions are shaped and dimensioned for receipt within the grooves formed in the bottom surface of the panels in a manner preventing movement in a direction parallel to the plane in which the panel lies and away from the connector. When the panels are connected using the connector, the resultant visible surface is composed of only a top surface of the panels.

It is still a further object of the present invention to provide a disengageable connector for interconnecting individual panels with identical edges to form a surface on a support structure. The connector includes a base and a projection extending vertically from the base. The projection includes an upwardly extending central stem with identical outwardly extending members extending therefrom in opposite directions and substantially parallel to the base. Each of the outwardly extending members includes a bottom surface with a downwardly sloping surface extending toward the central stem of the projection such that the bottom surface of each of the outwardly extending members forces a panel downwardly into contact with the base as a panel is forced toward the central stem such that the panel is prevented from moving in a direction substantially perpendicular to the plane in which an upper surface of a panel lies.

It is yet another object of the present invention to provide a disengageable connector for interconnecting individual panels with identical edges to form a temporary surface on a support structure. The connector includes a base and a projection extending vertically from the base. The projection includes an upwardly extending central stem with identical outwardly extending members extending therefrom in opposite directions and substantially parallel to the base. The first and second protrusions extend from the base, and are spaced apart from the projection and located on either side of the projection. The projection and the first and second protrusions selectively engage a panel to prevent movement of the panel in both a direction substantially perpendicular to the plane in which an upper surface of the panel lies and in a direction parallel to the plane in which the upper surface of the panel lies and away from the connector.

It is also another object of the present invention to provide a multidirectional individual panel for use in forming a surface comprised of at least two panels disengageably interconnected on a support structure. The panel includes a top surface, a bottom surface for contact with the support structure, and edges therebetween. The top surface includes a decorative wear surface. All edges include identical grooves extending substantially the entire length of the edge. The bottom surface includes identical grooves formed therein and open away from the top surface, wherein the grooves are parallel to, spaced from, and extend substantially the entire length of the edges.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a perspective view of a panel manufactured in accordance with the present invention.

FIG. 2 is a cross-sectional view of the panel shown in FIG. 1.

FIG. 3 is a schematic of a decorative surfacing layer.

FIG. 4 is a schematic of a backing layer.

FIG. 9 is a perspective view of a track locking strip.

FIG. 10 is a cross-sectional view of a track locking strip maintaining adjacent panels in a desired orientation.

DESCRIPTION OF THE PREFERRED EMBODIMENTS

Figure 5:
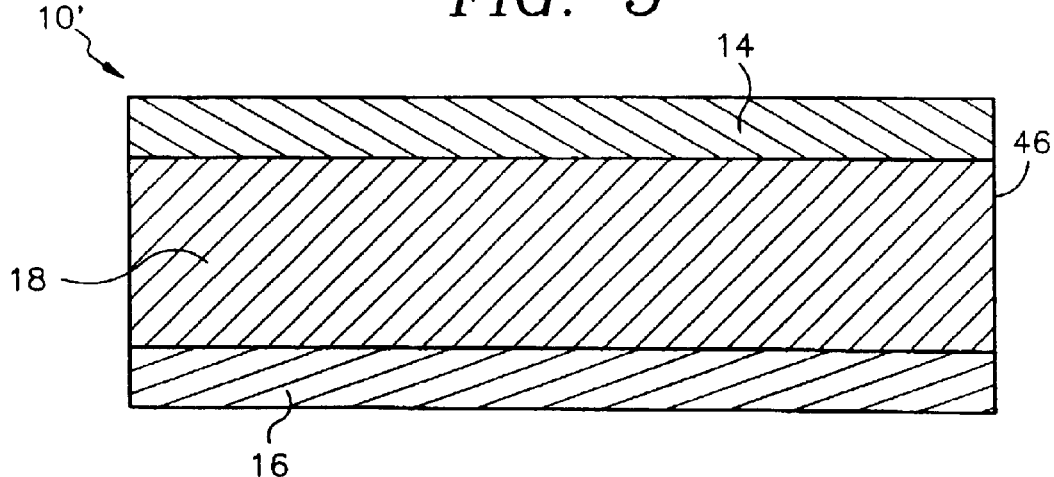
FIGS. 5, 6 and 7 are schematics showing the steps associated with the manufacture of panels in accordance with the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 1 and 2, a decorative laminate panel 10 having a water resistant edge 12 is disclosed. The decorative laminate panel 10 generally includes a decorative surfacing layer 14 (or decorative laminate), a backing layer 16 and a substrate 18, more particularly, corestock positioned between the decorative surfacing layer 14 and the backing layer 16. The substrate 18 includes a cut edge 20 wherein the decorative surfacing layer 14, the cut edge 20 of the substrate 18 and the backing layer 16 define a concave recess 22 (see FIGS. 2 and 6). The decorative laminate panel 10 further includes an edge member 24 positioned within the concave recess 22. The edge member 24 includes an outwardly facing interlocking profile 26 shaped and dimensioned for selective attachment to adjacent laminate panels.

By positioning the edge member 24 within the recess 22 the substrate 18 is sealed from the external environment. The decorative surfacing layer 14 and the backing layer 16 protect the top and bottom surfaces of the substrate 18. The edge member 24 engages the decorative surfacing layer 14 and the backing layer 16 within the recess 22 to prevent the passage of moisture to the edge 20 of the substrate 18. The structure substantially encapsulates the substrate 18, thereby protecting it from undesirable environmental conditions.

In accordance with a preferred embodiment of the present invention, the decorative surfacing layer 14 is a conventional surfacing layer commonly used in the fabrication of flooring panels. While the present panels are discussed throughout this specification with reference to flooring panels in particular, those skilled in the art will appreciate that the inventive concepts of the present invention may be applied in various ways without departing from the spirit of the present invention.

With reference to FIG. 3, the decorative surfacing layer 14 includes an overlay paper layer 28, a decorative sheet 30 and a core layer 32. The overlay paper layer 28 is preferably a melamine resin impregnated paper layer. The decorative sheet 30 is a conventional pattern sheet positioned directly beneath the overlay paper layer 28. When the decorative laminate 14 is fully heated and pressed, as will be discussed below in greater detail, the overlay paper layer 28 becomes translucent, fully exposing the decorative sheet 30. With this in mind, the decorative sheet 30 is substantially responsible for the aesthetic appearance of the finished decorative laminate 14. Decorative sheets are chosen from a wide array of available sheets. For example, the decorative sheet 30 may be a solid color (for example, white) or include an aesthetically appealing pattern.

As discussed above, the decorative sheet 30 provides the decorative laminate 14 with an attractive appearance. The overlay paper layer 28 and the decorative sheet 30 also dictate the surface characteristics of the final decorative laminate 14. For example, the compositions of the overlay and decorative sheets 28, 30 help to dictate the decorative laminate's resistance to chemical agents, heat, light, scuff and abrasion.

Decorative sheets are commonly manufactured from high quality 80–202 grams/m$^2$ ream weight, pigment filled, alpha cellulose paper impregnated with a water alcohol, or water solution, of melamine-formaldehyde resin. The resin impregnated decorative sheets are subsequently dried, partially cured, and finally cut into sheets. The pigment filled, alpha cellulose paper of the decorative sheet may include a solid color, a decorative design, or a photogravure reproduction of natural materials, such as, wood, marble, leather, etc. The aesthetic characteristics of the cellulose paper are revealed as the laminate's decorative design upon completion of the decorative laminate.

The core layer 32 is preferably composed of a sheet of phenolic resin impregnated paper, although other materials may be used without departing from the spirit of the present invention. In accordance with a preferred embodiment of the invention, the core layer 32 includes one sheet of 120–299 grams per square meter dry phenolic resin impregnated kraft paper. The kraft paper is impregnated throughout with a substantially cured phenolic resin which has been partially cross linked (B-staged) during the initial laminating step.

The decorative laminate 14 in accordance with the present invention is formed in the same manner as conventional decorative laminates. As such, the overlay layer 28, the decorative sheet 30 and the core layer 32 are first stacked and placed between steel plates. The laminate stack is then subjected to temperatures in the range of 121° C.–160° C. and pressures of about 56.24 kg/cm$^2$ to 112.48 kg/cm$^2$ for a time sufficient to consolidate the laminate and cure the resins (generally about 25 minutes to an hour). The pressure and heat force the resin in the paper sheets to flow, cure and consolidate the sheets into a unitary laminated mass referred to in the art as a high pressure decorative laminate. Generally, more than one laminate is formed at one time. Multiple laminates are formed by inserting a plurality of assembled sheets between press plates in a stack. Release sheets may be positioned between the assembled sheets to separate the various laminates stacked together. After consolidation, the release sheets allow the individual laminates to be separated.

Although high pressure decorative laminates are preferred for use in accordance with the present invention, low pressure, direct pressure or continuous decorative laminates may be used without departing from the spirit of the present invention.

With regard to the backing layer 16, and with reference to FIG. 4, it is commonly composed of melamine impregnated paper 34 and one, or more, layers of phenolic resin impregnated kraft paper 36, 38 (for the purpose of disclosure 2 are shown). While a standard backing layer is disclosed in accordance with a preferred embodiment of the present invention, the backing layer may take various forms known to those skilled in the art without departing from the spirit of the present invention. As with the decorative surfacing layer 14, the three sheets 34, 36, 38 making up the backing layer 16 are stacked, heated and pressed to cure and consolidate the sheets, thereby, forming a unitary sheet which may be used as a backing layer in accordance with the present invention.

Finally, the substrate 18 is a conventional wood-based substrate commonly used in the manufacture of decorative laminate panels. With this in mind, the substrate 18 is preferably formed of plywood, particleboard, chipboard, medium density fiberboard, high density fiberboard, woods, filled plastics, unfilled plastics, ceramics, fibers, polymeric foams, and combinations thereof, although other materials may be used without departing from the spirit of the present invention.

The decorative surfacing layer 14 and the backing layer 16 are adhesively bound to respective first and second sides of the substrate 18 to form a raw decorative laminate panel 10' (see FIG. 5). However, and as briefly discussed in the Background of the Invention, recent advances in decorative laminate flooring panels dictate that the edge profile of the decorative laminate panel be shaped and dimensioned for selective interlocking with adjacent panels.

Figure 6:
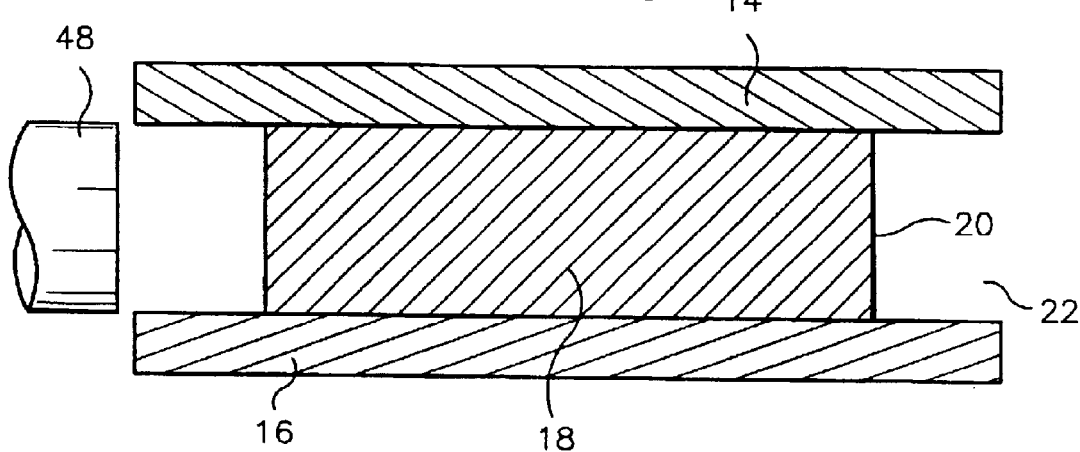
Figure 7:
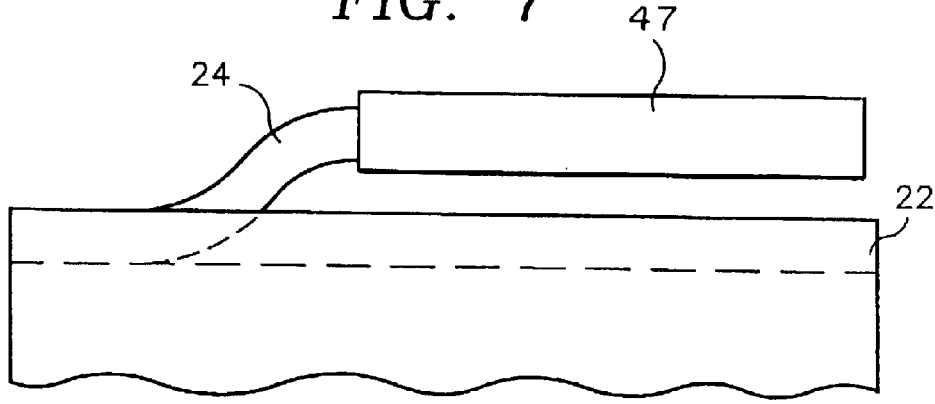

With this in mind, and with reference to FIG. 6, a portion of the substrate 18 is machined away between the decorative surfacing layer 14 and the backing layer 16 to form a concave recess 22. The edge member 24 is positioned therein (see FIG. 7). The edge member 24 is preferably formed in situ from a thermoplastic material and creates a water resistant edge for the resulting decorative laminate panel 10. Specifically, by placing the edge member 24 within the recess 22, the substrate is protected from moisture by the edge member 24 along its cut edge 20, by the decorative surface layer 14 along its top side and by the backing layer 16 along its bottom side. Although the figures disclosing the present invention show edge members 24 positioned on opposite sides of the decorative laminate panel 10, the edge members 24 are preferably positioned on all edges of the decorative laminate panel 10 in order to accommodate attachment of adjacent panels along any edge of the panel 10.

In accordance with a preferred embodiment of the present invention, the edge member 24 may be formed from thermoplastic materials, including, but not limited to, vinyls, polyolefins, styrenics, polyamides, polyimides, polyethers, polyesters, acrylics, acetals, thermoplastic olefins, thermoplastic urethanes, thermoplastic elastomers. In addition, it is also envisioned that the edge member may be formed from thermoset materials, such as, epoxies, polyurethanes, phenolics, melamines, etc. It is further contemplated that the edge member may be a foamed thermoplastic. More specifically, the edge member 24 is preferably formed from acrylic-butadiene-styrene (ABS), although other materials may be used without departing from the spirit of the present invention.

The extrusion of a thermoplastic edge member 24 in accordance with the present invention permits ready fabrication of a wide variety of edge profiles not readily produced via the use of known cutting techniques. Extrusion of the edge member 24 from a thermoplastic material permits ready formation of a variety of shapes. Similarly, the edge member 24 may be machined to achieve various desired profiles. It is also contemplated that the edge member may be formed via injection molding, or other fabrication processes known for use with thermoplastics or thermosets, without departing from the spirit of the present invention.

In accordance with a preferred embodiment of the present invention, and with reference to FIG. 2, the edge member 24 is formed with a first end 40 shaped and dimensioned to fit within the concave recess 22 defined by the cut edge 20, the decorative surfacing layer 14 and the backing layer 16. The second end, or edge profile 42, of the edge member 24 is shaped to accommodate the specific interlock design being applied in accordance with the chosen decorative laminate paneling system. For example, and with reference to FIG. 2, the interlocking profile 26 of the edge profile 42 may take the form of a simple dado 26 shaped and dimensioned to receive a connecting system adapted to hold adjacent panels in a close relationship.

The decorative laminate panels 10 in accordance with the present invention are generally formed by first bonding a decorative surfacing layer 14 to a first side of the substrate 18 and bonding a backing layer 16 to a second side of the substrate 18. A predetermined portion of the preliminary exposed core edge 46 (see FIG. 5) of the substrate 18 is then cut away to create a cut edge 20 and a concave recess 22 defined by the cut edge 20, the decorative surfacing layer 14 and the backing layer 16. While cutting is employed in the creation of the recess in accordance with a preferred embodiment of the present invention, other techniques may be employed in creating the recess without departing from the spirit of the present invention.

An edge member 24 shaped and dimensioned for placement within the concave recess 22 is then extruded and positioned within the concave recess 22 with the interlocking profile 42 exposed for selective attachment to adjacent laminate panels.

The initial step of bonding the decorative surfacing layer 14 and the backing layer 16 to the substrate 18 is discussed above and follows conventional techniques known to those skilled in the art. The cutting step is achieved by machining the substrate 18 along its exposed edge 46 to form a concave recess 22 along the edge of the panel 10 and between the decorative surfacing layer 14 and the backing layer 16.

Specifically, a precision milling tool 48 is calibrated to remove a predetermined portion of the substrate 18 between the decorative surfacing layer 14 and the backing layer 16 (see FIG. 6). When properly calibrated, the milling tool 48 removes the preliminary exposed edge 46 of the substrate 18 without destroying the decorative surfacing layer 14 or the backing layer 16.

Once the concave recess 22 is formed in the decorative panel 10, the edge member 24 is extruded and inserted within the concave recess 22. In accordance with a preferred embodiment of the present invention, the edge member 24 is extruded into the concave recess 22 (see FIG. 7). As such, the first end 40 of the edge member 24 is shaped and dimensioned to readily fit within the concave recess 22 as it exits the extrusion die 47. After leaving the extrusion die 47, the edge member 24 is placed within the concave recess 22 where it is held in position as it cures and bonds within the recess 22. Once the edge member 24 is sufficiently cooled, the edge profile 42 thereof may be further processed to achieve the desired final product.

Figure 8:
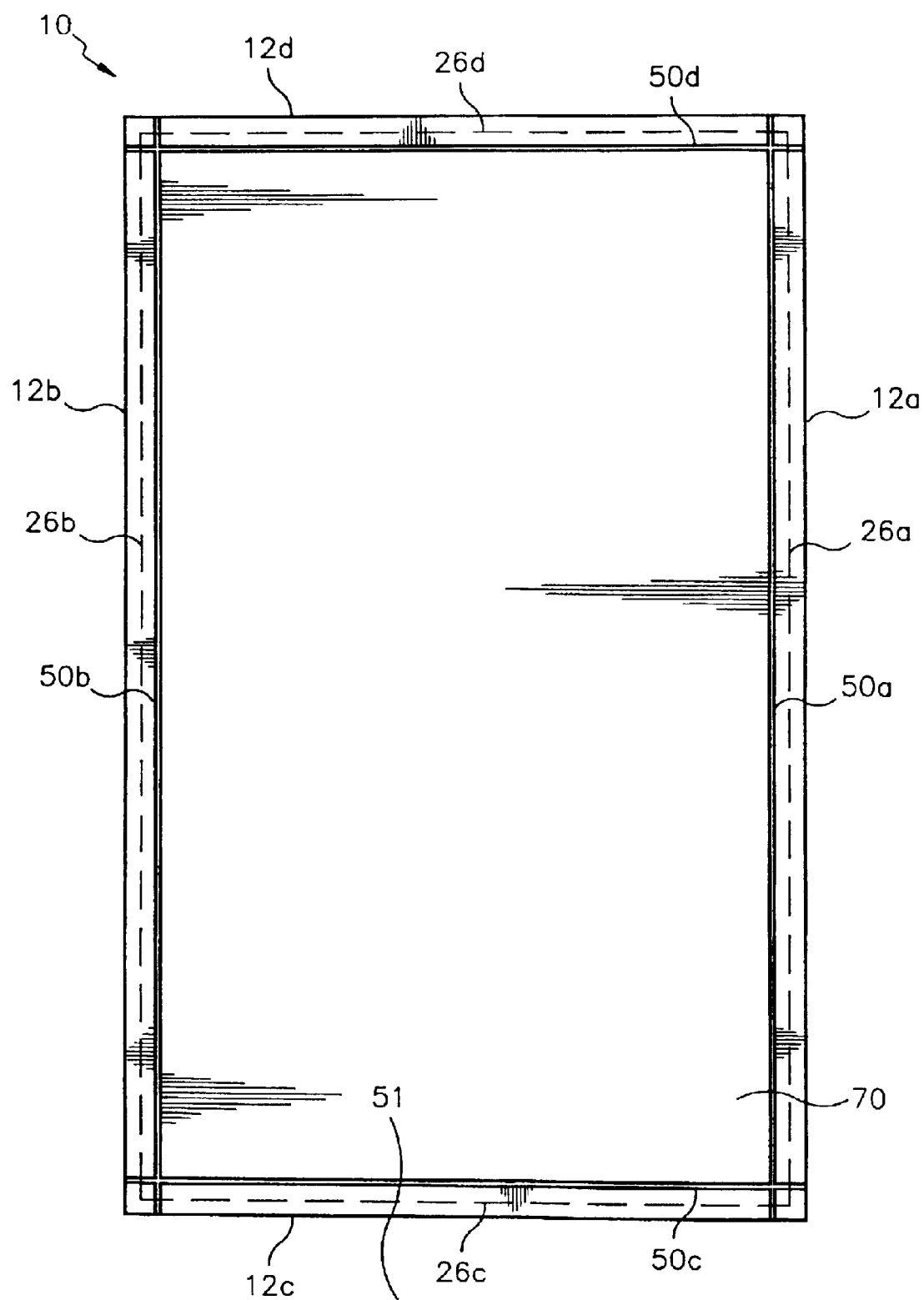
FIG. 8 is a bottom view of the panel shown in FIG. 1.

With reference to FIGS. 1 and 8, the edge profile 42 of panels 10 formed in accordance with the present invention is formed to be the same about the entire perimeter of the panel 10 in order to take advantage of a convenient track locking system. That is, each edge 12a, 12b, 12c, 12d of the panels 10 formed in accordance with the present invention is formed with an identical dado 26a, 26b, 26c, 26d so as to be compatible with a universal interlock system providing versatility in the installation of such panels. In addition, grooves 50a, 50b, 50c, 50d shaped and dimensioned for the receipt of a track locking strip 52 are formed in the bottom surface 70 of the panel 10 for installation in a manner which will be discussed below in greater detail.

Figure 11:
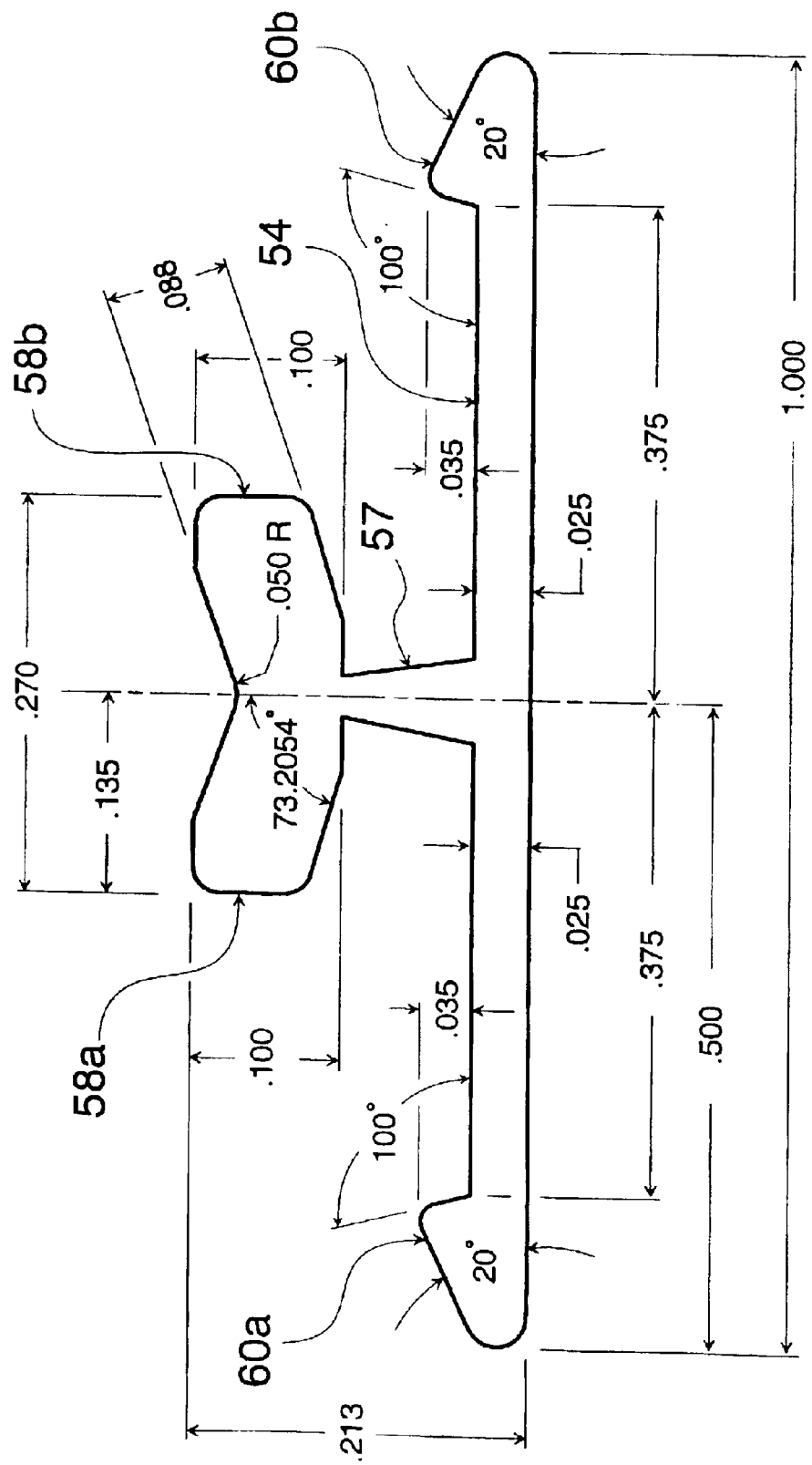
FIG. 11 is an end view of a track locking strip in accordance with the present invention.
Figure 12:
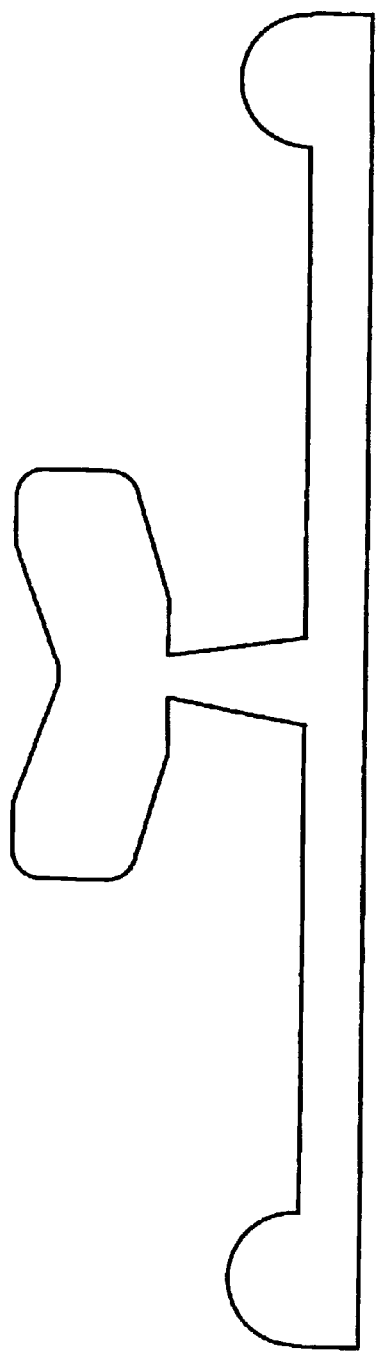
FIGS. 12 and 13 are end views of alternate embodiments of a track locking strip.
Figure 13:
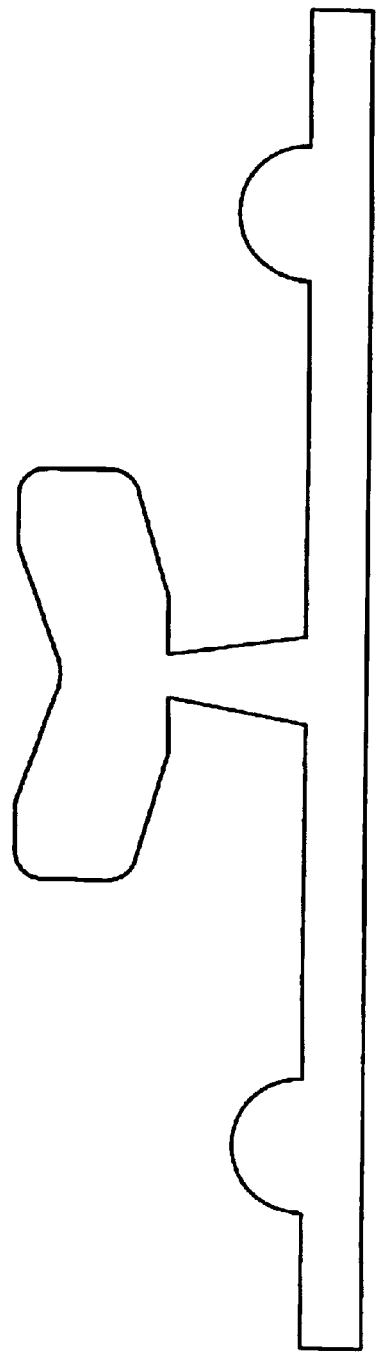

A preferred embodiment of the track locking strip 52, or connector, of the present inventive system is shown in FIGS. 9 to 11. The scale of FIG. 11 is 9 times the actual size, i.e., 1.000 equals 25.4 mm. It is also to be understood that the base 54 of the track locking strip 52 may be constructed such that it does not touch the support structure, i.e., wherein the track locking strip 52 is fully encompassed by the adjacent panels. Other embodiments of the track locking strip are disclosed in FIGS. 12 and 13.

The terms "vertical" and "horizontal" are used below to describe the present invention as it might be used in the installation of a flooring system where the panels are placed upon a horizontal support surface. However, those skilled in the art will readily appreciate that the present invention may be used in other applications beyond flooring systems. As such, the relative terms "horizontal" and "vertical" are used merely as explanatory terms and should not be considered to limit the scope of the present invention.

In accordance with a preferred embodiment of the present invention, the track locking strip 52 is formed of extruded aluminum. However, it is contemplated that the track locking strip may be manufactured from materials selected from the group consisting of filled and unfilled plastics, elastomers, wood composites, ceramics, metals, foamed plastics and combinations thereof. Depending upon the material and size, the track locking strip may be manufactured using techniques known in the art.

Briefly, and with reference to FIGS. 9 and 10, a preferred embodiment of a track locking strip 52 in accordance with the present invention is disclosed. The track locking strip maintains the same profile along its entire length. The track locking strip 52 includes a base 54, a projection 56 having a central stem 57 with first and second outwardly extending members 58a, 58b extending therefrom, and first and second protrusions 60a, 60b spaced apart from, and on either side of, the projection 56 projecting upwardly from base 54. The first and second protrusions 60a, 60b are preferably rounded on the top portion as shown, and taper away, i.e., decrease in height, as they move away from the center of the base 54 toward the edge of the base 54. Thus, the portion 64a, 64b of the first and second protrusions 60a, 60b closest to the center of the base 54, and projection 56, extend the greatest distance vertically, forming a central facing surface 66a, 66b on each of the protrusions 60a, 60b. By forming the first and second protrusions 60a, 60b with central facing surfaces 66a, 66b they "grip" the grooves 50a, 50b, 50c, 50d of adjacent panels and prevent the adjacent panels from moving apart. In other words, and as shown in FIG. 10, the central facing surfaces 66a, 66b of the first and second protrusions 60a, 60b (i.e., the central facing surface) engage the outer walls 68a, 68b of the respective grooves to prevent the adjacent panels 10 from moving in a direction laterally away from the track locking strip 52 to which they are bound.

The panels 10 used in accordance with the present invention preferably include an edge profile 42 with dados 26a–d shaped to receive the first and second outwardly extending members 58a, 58b of the track locking strip 52 such that the visible flooring surface only includes the top decorative layer 14 when the panels 10 are connected. The outwardly extending members 58a, 58b and panel dados 26a–d are formed to vertically connect adjacent panels 10 when two panels are joined together using the disclosed track locking strip 52. That is, if two panels are connected at their edges, the edges of the opposing panels do not move up or down (vertically) relative to each other and thus, provide a level uniform seam between the adjacent panels. Similarly, and where the panels are not secured to a horizontal support surface, the connected panels are engaged against movement relative to each other in a direction substantially perpendicular to the plane in which the decorative surface layer 14 of the panels lie.

In addition to the vertical connection provided by the outwardly extending members 58a, 58b, and as discussed above, the panels 10 and track locking strip 52 are shaped to provide a horizontal connection between adjacent panels 10 at their edges. Specifically, the track locking strip 52 is provided with protrusions 60a, 60b shaped and dimensioned to securely fit within grooves 50a, 50b found in the bottom surface of the panel 10. The protrusions 60a, 60b are formed to prevent adjacent panels 10 from moving in a horizontal plane when the panels 10 are properly seated on the track locking strip 52. For example, and according to one embodiment, the connected panels 10 are engaged against movement relative to each other in a direction horizontal to the support surface. That is, if two panels 10 are connected at their edges, the interaction between the respective grooves 50a, 50b and protrusions 60a, 60b prevents the edges from moving horizontally away from each other and a gap between adjacent panels 10 is prevented.

The ability of the present track locking strip 52 to prevent both horizontal and vertical movement of the adjacent panels 10 is a direct result of the cooperating nature of the first and second protrusions 60a, 60b and the outwardly extending members 58a, 58b. Specifically, the bottom surface 72a, 72b of both the first and second outwardly extending members 58a, 58b is angled downwardly as it extends toward the stem 57 of the central projection 56, and includes a flat portion 74a, 74b adjacent the stem 57 of the central projection 56. In addition, the vertical distance between the flat portion 74a, 74b of the bottom surface 76a, 76b of the respective outwardly extending members 58a, 58b and the flat portion 72a, 72b along the topside 78a, 78b of the respective outwardly extending members 58a, 58b is substantially equal to the height of the dado 26a–d formed in the edge profile 42 of the panels 10. This spacing holds the panels 10 in place and substantially prevents the panels 10 from moving up and down. Since the distance from the dado 26a–d to the upper surface of the panel 10 is always the same, the connected panels 10 will provide a level uniform seam between the adjacent panels.

Controlled positioning of the panels is further provided by ensuring that the protrusions 60a, 60b are always spaced the same distance from the upper surface of the panels 10 regardless of the panel thickness. This is accomplished by adjusting the depth of the grooves 50a, 50b based upon the thickness of the panel 10 (for example, a thicker panel will be cut with a deeper groove and a thinner panel will be cut with a shallower groove). As a result, the distance from the grooves 50a, 50b to the upper surface of the panel 10 and the distance from the protrusions 60a, 60b to the upper surface of the panel 10 are always the same regardless of the thickness of the panel. Thus, connected panels 10 will always exhibit a level uniform seam between the adjacent panels.

These features, in combination with the first and second protrusions 60a, 60b discussed above, provide a secure, selectively releasable coupling between the track locking strip 52 and panels 10 secured thereto. In practice, as a panel 10 is being secured to the track locking strip 52, the outer/hotizontal edge 80a, 80b (only two shown) of the panel dado 26a–d receives the outwardly extending member 58a, 58b of central projection 56. As the panel 10 is pushed toward the stem 57 of the central projection 56, the bottom surface 72a, 72b of the outwardly extending member 58a, 58b forces the panel 10 downwardly toward the base 54 of the track locking strip 52 by engaging the bottom wall 82a, 82b of the dado 26a–d. Movement in this way is further facilitated by sloping the topside 78a, 78b of the outwardly extending member 58a, 58b downward as it extends toward the stem 57 of the central projection 56. This continues until the bottom wall 82a, 82b of the dado 26a–d reaches the flat portion 76a, 76b along the bottom surface 72a, 72b of the outwardly extending member 58a, 58b.

At this point, the downward pressure applied by the outwardly extending member 58a, 58b forces the panel 10 downward such that the protrusion 60a, 60b is seated within the groove 50a, 50b with the central facing surface 66a, 66b engaging the outer wall 68a, 68b of the groove 50a, 50b to prevent the panels 10 from moving in a direction laterally away from the track locking strip 52 to which they are bound. In addition, the fact that the height of the dado 26a–d is slightly larger than the spacing between the flat portions 74a, 74b, 76a, 76b of the bottom surface 72a, 72b and topside 78a, 78b of the outwardly extending member 58a, 58b, ensures that the outwardly extending member 58a, 58b snuggly fits within the dado 26a–d to prevent vertical movement of the panel 10.

Various non-limiting embodiments of the track locking strip of the present invention have been described and the panels of the present invention are necessarily configured, for example, to correspond to these track locking strips to achieve the advantages of the present invention. It should be understood that the panels may be configured to provide an exact fit with the track locking strip or a non-exact fit as long as the advantages of the present invention are achieved. For example, where a permanent structure is desired, an embodiment allowing space for glue to accumulate between the panels and the track locking strip may be appropriate. In addition, and especially when a temporary structure is desired, it might be undesirable for the panels and track locking strip to fit together exactly when utilizing certain reinforcing substrate materials. For example, some space between certain portions of the track locking strip projections and the recesses of the panels can be tolerated as long as the advantages of the invention are achieved.

The panels are constructed such that they disengageably interconnect with the track locking strip of the present invention. That is, while the track locking strips and panels are securely connected to perform the function of a flooring surface, the panels can, if desired, be removed by lifting a panel and pulling the panel away from the track locking strip to disengage the panel/strip interconnection.

The panels of the present invention are constructed to always form a tight uniform level seam between adjacent panels when connected together utilizing the track locking strip of the present invention. The panels are constructed such that the depth of the grooves in the bottom surface of each panel are always a certain distance from the top wear surface, i.e., the exposed portion of the decorative surface layer. As stated above, these grooves are shaped to receive a protrusion projecting from the base of the track locking strip to disengageably interconnect two panels together horizontally. Thus, both panels rest on the track locking strip at the interconnection point where the respective protrusions meet the grooves With this in mind, and as discussed above, this arrangement provides a system wherein the distance from the grooves to the upper surface of the panel and the distance from the protrusions to the upper surface of the panel are always the same regardless of the thickness of the panel. Thus, connected panels will always exhibit a level uniform seam between the adjacent panels.

Consequently, even when the support structure or ground floor is uneven or not level, the seam is always tight, uniform and level. Even if the thickness of the panels vary, a uniform level seam is provided when two panels are interconnected because the depth of the grooves in the bottom surface of each panel is formed to be a certain distance from the top wear surface. Therefore, the top wear surfaces of two adjacent panels will always come to rest at the same level, i.e., a certain distance from the base protrusions of the track locking strip. Preferably, the panels of the present inventive system range in thickness from about 0.610 cm to about 0.813 cm.

The system of the present invention also provides panels which utilize substantially the entire manufactured laminate top wear surface to yield an economic advantage over many prior art systems. In prior art systems, a panel is manufactured with a top wear surface. After manufacture, the panel is machined at the edges to remove a portion of the top wear surface and form a tongue extension for insertion into a corresponding groove of an adjacent panel. To form the tongue, the top wear surface must be machined off. This decreases the marketable square footage of flooring per panel. In addition, the removal of more top wear surface accelerates tool wear. Tools, therefore, require more maintenance and/or replacement. Consequently, the cost and time of manufacture increases.

Utilizing the system of the present invention, the amount of top wear surface of the panels that must be machined is greatly reduced. Substantially the entire manufactured decorative top wear surface is sold to the end user—eliminating waste experienced in prior art systems. As a result, the total square footage of saleable flooring produced by a plant is increased and costs are reduced.

In addition, the track locking strips of the present invention are not fixed to the panels at the factory and thus, no adhesive or other fastening means is required to be applied—again, reducing material costs, labor costs, and time to manufacture.

The system of the present invention also provides panels which are less susceptible to damage than prior art tongue and groove systems. For example, it is known that the tongues of panels are susceptible to damage during shipping, handling, and even assembly and disassembly. If a tongue is broken off or substantially deformed, it will not engage the groove of an adjacent panel and is rendered useless. The panels of the present invention do not include tongues—they only have recesses and/or grooves formed therein. It is difficult, if not impossible, to damage a recess or groove during shipping, handling, assembly and disassembly. Thus, the panels of the present invention are more durable than many prior art panels. This is a significant advantage when panels are used in floating floor surfaces and temporary flooring constructions which will be removed and reassembled many times. The system of the present invention provides track locking strips (preferably made from metal) which are fairly tough, as well as easy and economical to replace, when compared to the cost of a new panel. The present inventive system substantially reduces, if not eliminates, the risk of damaging a panel to the extent that it is inoperable.

The flooring system of the present invention provides a flooring surface that is easy to repair and/or change. For example, many prior art systems (see the systems disclosed in U.S. Pat. Nos. 5,706,621 and 5,860,266) require holding the new panel to be joined at an angle relative to a principal plane of a first laid panel and angling down the new panel to become mechanically locked underneath a portion of the first panel. This is repeated until a floor is constructed. If the fifth panel in a sequence of 20 panels needs to be replaced, e.g., due to damage, panels 6 through 20 must be removed in reverse order to reach panel 5. Utilizing the system of the present invention, which does not require the angling down of each new panel underneath a portion of an existing panel, panels 1 through 4 of the sequence can be removed and panel 5 replaced. Thus, the present inventive system substantially reduces the time and aggravation of removing and replacing panels. In addition, due to the fact that the panels of the present inventive system do not require a single directional laying sequence, more than one person can construct different portions of a single flooring surface simultaneously. This is especially advantageous in relation to the installation of large flooring surfaces, e.g., retail spaces.

The panels of the present inventive system also provide substantially more aesthetic flexibility than prior art panels. For example, since the panels are not right or left handed, i.e., one or unidirectional, but instead are multidirectional due to each edge being identical, each individual panel can be placed into a flooring surface being constructed in the most eye-appealing manner. Moreover, the panels of the present inventive system allow for flexibility in designing and constructing parquet-type flooring surfaces. For example, it is known that a panel is usually manufactured wherein the grain runs in the machine direction. However, since the panels of the present invention are multidirectional, the direction of the grain on the flooring surface can be easily alternated to form a parquet floor, or a floor of any grain design.

The panels of the present inventive system also reduce waste during floor construction. Typically, when constructing a flooring surface using prior art systems with handed panels, the construction starts at one wall and proceeds across the space to the other wall. A space to be floored is normally not of a dimension which is equally divisible by the size of a flooring panel, i.e., panels at an end wall have to be cut length or width wise to fit. In prior art systems utilizing handed panels, there is a substantial possibility that the remaining portion is unusable once the panel is cut. For example, in a prior art system utilizing rectangular panels with tongues and grooves on opposing intersecting edges respectively, two panel pieces are formed with one long edge of each either being a tongue or a groove when a panel is cut lengthwise. At the end wall a portion of a panel may be needed with a groove on the long edge and it is inserted. As a result, only a panel piece having a tongue on the long edge remains without a long groove edge.

However, with the panels of the present invention, i.e., each panel is constructed with grooves on all edges, any panel portion remaining after completing the floor up to a portion of the end wall is also usable to complete another portion of the floor up to the end wall.

The panels of the present inventive system are constructed such that it is not necessary to hold one panel at an angle relative to the other panel and angle down the new panel into place when assembling two panels together. The fact that the panels can be interconnected by forcing two together while they are lying in the same plane is very advantageous in relation to constructing certain portions of flooring surfaces challenged by various physical boundaries, e.g., the interface between a flooring surface and a fireplace.

Though it can be envisioned that the track locking system may be used with traditional laminate floors or with all wood floors, one can understand the advantages of the decorative laminate panels manufactured in accordance with the present invention to offer a substantially water resistance edge. The thermoplastic edge member seals the cut edge of the substrate. This protects the wood-based substrate from the undesirable effects resulting from exposure to moisture. In this way, decorative laminate panels in accordance with the present invention are not subject to the negative effects imposed as moisture seeps between the adjacent panels and into the substrate positioned between the decorative surfacing layer and the backing layer.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A method for forming the edge profile of a decorative laminate panel, wherein the decorative laminate panel includes a decorative surfacing layer, a backing layer and a substrate positioned between the decorative surfacing layer and the backing layer, the method comprising the following steps:

creating a recess defined by the decorative surfacing layer, the substrate and the backing layer;

forming an edge member shaped and dimensioned for placement within the recess, the edge member including an interlocking profile shaped and dimensioned for facilitating selective attachment to adjacent laminate panels; and positioning the edge member within the recess with the interlocking profile exposed for selective attachment to adjacent laminate panels, wherein the step of positioning includes extruding the edge member into the recess such that the edge member is positioned within the recess while the edge member is pliable and the edge member is permitted to harden within the recess.

2. The method according to claim 1, wherein the substrate includes a preliminary exposed edge and the step of creating includes cutting away a predetermined portion of the preliminary exposed edge of the substrate to create a cut edge, the recess thereby being defined by the cut edge, the decorative surfacing layer and the backing layer.

3. The method according to claim 1, wherein the edge member is fanned from a thermoplastic material.

4. The method according to claim 1, wherein the edge member is formed from a polymeric material chosen from the group consisting of vinyls, polyolefins, styrenics, polyamides, polyimides, polyethers, polyesters, acrylics, acetals, thermoplastic olefins, thermoplastic urethanes, thermoplastic elastomers, epoxies, polyurethanes, phenolics and melamines.

5. The method according to claim 1, wherein the step of positioning includes placing the edge member within the recess such that the substrate is fully covered and sealed from the environment.

6. A method for forming the edge profile of a decorative laminate panel, wherein the decorative laminate panel includes a decorative surfacing layer, a backing layer and a substrate positioned between the decorative surfacing layer and the backing layer, the method comprising the following steps:

creating a recess defined by the decorative surfacing layer, the substrate and the backing layer;

forming an edge member shaped and dimensioned for placement within the recess, the edge member including an interlocking profile shaped and dimensioned for facilitating selective attachment to adjacent laminate panels and wherein the step of forming indudes extruding an edge member; and positioning the edge member within the recess with the interlocking profile exposed for selective attachment to adjacent laminate panels, wherein the decorative surfacing layers of adjacent decorative laminate panels meet alone respective edges to form a level, uniform seam between adjacent decorative laminate panels and wherein the step of positioning includes extruding the edge member into the recess such that the edge member is positioned within the recess while the edge member is pliable and the edge member is permitted to harden within the recess.

7. The method according to claim 6, wherein the step of positioning includes placing the edge member within the recess such that the substrate is fully covered and sealed from the environment.

8. The method according to claim 6, wherein the edge member is formed from a polymeric material chosen from the group consisting of vinyls, polyolefins, styrenics, polyamides, polyimides, polyethers, polyesters, acrylics, acetals, thermoplastic olefins, thermoplastic urethanes, thermoplastic elastomers, epoxies, polyurethanes, phenolics and melamines.

9. A method for forming the edge profile of a decorative laminate panel, wherein the decorative laminate panel includes a decorative surfacing layer, a backing layer and a substrate positioned between the decorative surfacing layer and the backing layer, the method comprising the following steps:

creating a recess defined by the decorative surfacing layer, the substrate and the backing layer;

forming an edge member shaped and dimensioned for placement within the recess, the edge member inducing an interlocking profile shaped and dimensioned for facilitating selective attachment to adjacent laminate panels; and positioning the edge member within the recess with the interlocking profile exposed for selective attachment to adjacent laminate panels, wherein the decorative surfacing layers of adjacent decorative laminate panels meet along respective edges to form a level, uniform seam between adjacent decorative laminate panels and, wherein the step of positioning includes extruding the edge member into the recess such that the edge member is permitted to harden within the recess.

10. A method for forming a decorative laminate panel, comprising the following steps:

bonding a decorative suffacing layer to a first side of a substrate and bonding a backing layer to a second side of a substrate; wherein the decorative surfacing layer, the substrate and the backing layer define a recess along the edge of the panel;

forming an edge member shaped and dimensioned for placement within the recess, the edge member including an interlocking profile shaped and dimensioned for facilitating selective attachment to adjacent laminate panels and wherein the step of forming includes extruding an edge member; and positioning the edge member within the recess with the interlocking profile exposed for selective attachment to adjacent laminate panels, wherein the decorative surfacing layers of adjacent decorative laminate panels meet along respective edges to form a level, uniform seam between adjacent decorative laminate panels and wherein the step of positioning includes extruding the edge member into the recess such that the edge member is positioned within the recess while the edge member is pliable and the edge member is permitted to harden within the recess.

11. The method according to claim 10, wherein the substrate includes a preliminary exposed edge, and the method includes the further step of cutting away a predetermined portion of the preliminary exposed edge of the substrate to create a cut edge, the substrate being cut away such that the recess is defined by the cut edge, the decorative surfacing layer and the backing layer.

12. The method according to claim 10, wherein the edge member is formed from a thermoplastic material.

13. The method according to claim 10, wherein the step of positioning including placing the edge member within the recess such that the substrate is fully covered and sealed from the environment.

14. A method for forming a decorative laminate panel, comprising the following steps:

bonding a decorative surfacing layer to a first side of a substrate and bonding a backing layer to a second side of a substrate, wherein the decorative surfacing layer, the substrate and the backing layer define a recess alone the edge of the panel;

forming an edge member shaped and dimensioned for placement within the recess, the edge member including an interlocking profile shaped and dimensioned for facilitating selective attachment to adjacent laminate panels; and positioning the edge member within the recess with the interlocking profile exposed for selective attachment to adjacent laminate panels, wherein the decorative surfacing layers of adjacent decorative laminate panels meet along respective edges to form a level, uniform seam between adjacent decorative laminate panels and wherein the step of positioning includes extruding the edge member into the recess such that the edge member is positioned within the recess while the edge member is pliable and the edge member is permitted to harden within the recess.

15. The method according to claim 14, wherein the step of positioning includes placing the edge member within the recess such that the substrate is fully covered and sealed from the environment.

* * * * *